United States Patent
Cloft et al.

(10) Patent No.: US 9,126,691 B2
(45) Date of Patent: Sep. 8, 2015

(54) ACCESS DOOR FOR GAS TURBINE ENGINE COMPONENTS

(75) Inventors: Thomas G. Cloft, Glastonbury, CT (US); Robert L. Gukeisen, Middleton, CT (US)

(73) Assignee: United Technologies Corporation, Hartford, CT (US)

( * ) Notice: Subject to any disclaimer, the term of this patent is extended or adjusted under 35 U.S.C. 154(b) by 2801 days.

(21) Appl. No.: 11/755,030

(22) Filed: May 30, 2007

(65) Prior Publication Data

US 2009/0129922 A1 May 21, 2009

(51) Int. Cl.
*B64D 29/08* (2006.01)
*F01D 25/24* (2006.01)
*F02K 3/06* (2006.01)

(52) U.S. Cl.
CPC ............ *B64D 29/08* (2013.01); *F01D 25/24* (2013.01); *F02K 3/06* (2013.01); *F05D 2240/14* (2013.01); *F05D 2240/90* (2013.01); *F05D 2250/30* (2013.01)

(58) Field of Classification Search
USPC ............ 244/129.4, 54; 415/201, 213.1; 60/226.2, 226.3, 228
See application file for complete search history.

(56) References Cited

U.S. PATENT DOCUMENTS

| | | | |
|---|---|---|---|
| 4,549,708 A | 10/1985 | Norris | |
| 4,825,648 A | 5/1989 | Adamson | |
| 5,046,689 A * | 9/1991 | Shine | 244/129.4 |
| 5,157,915 A | 10/1992 | Bart | |
| 5,213,286 A | 5/1993 | Elliott et al. | |
| 5,249,417 A * | 10/1993 | Duesler et al. | 60/772 |
| 5,350,136 A | 9/1994 | Prosser et al. | |
| 5,524,847 A | 6/1996 | Brodell et al. | |
| 5,852,928 A * | 12/1998 | Vauchel | 60/226.2 |
| 6,227,485 B1 | 5/2001 | Porte | |
| 6,334,730 B1 | 1/2002 | Porte | |
| 6,340,135 B1 | 1/2002 | Barton | |
| 6,517,027 B1 | 2/2003 | Abruzzese | |
| 7,090,165 B2 | 8/2006 | Jones et al. | |
| 7,430,852 B2 | 10/2008 | Beutin et al. | |
| 2006/0101804 A1* | 5/2006 | Stretton | 60/226.1 |
| 2006/0145001 A1 | 7/2006 | Smith | |

FOREIGN PATENT DOCUMENTS

| | | |
|---|---|---|
| FR | 2900907 | 11/2007 |
| GB | 2202588 | 9/1988 |
| GB | 2403774 A | 1/2005 |

OTHER PUBLICATIONS

European Search Report dated Aug. 5, 2011.

* cited by examiner

*Primary Examiner* — Steven Sutherland

(74) *Attorney, Agent, or Firm* — Carlson, Gaskey & Olds, PC

(57) ABSTRACT

An access door is provided in a housing for a gas turbine engine, with the access door being movable to an access position independent of any required movement of any cowl door or a fan duct door.

18 Claims, 2 Drawing Sheets

ACCESS DOOR FOR GAS TURBINE ENGINE COMPONENTS

BACKGROUND OF THE INVENTION

This application relates to an access door provided in an inner housing of a gas turbine engine to provide access to internal components, without the need to open the cowl or fan duct doors.

Gas turbine engines are known, and often include a fan delivering air to a compressor. Air is compressed in the compressor and delivered downstream to be mixed with fuel and combusted in a combustion section. Products of this combustion pass over turbine rotors, and drive the turbine rotors to rotate. A portion of the air delivered by the fan passes into a bypass duct about an engine core and is not delivered to the compressor. This air provides the majority of thrust for such a gas turbine engine.

A nacelle surrounds the fan, and defines the bypass duct with an inner housing. The inner housing surrounds the engine core. Typically fan cowl doors, and fan duct/thrust reverser doors (hereafter "fan duct doors") are provided in the nacelle. These doors may be pivoted to an open position to provide access to the inner components in the inner housing. Typically, when these doors pivot, they carry a portion of the internal housing to provide access to the internal components. Thus, to provide access to internal components, the fan cowl doors, or the fan duct doors must be pivoted to an open position. This is somewhat cumbersome and time consuming, particularly when required for routine maintenance to an internal component such as the gear box or an electrical generator.

Locally positioned small access doors are incorporated into gas turbine engines to facilitate simple maintenance such as filling oil tanks or reading visual indications of an electrical generator oil level. However, these access doors have not been sufficiently large to allow maintenance such as removal or replacement of an auxiliary gear box or an electrical generator.

SUMMARY OF THE INVENTION

In a disclosed embodiment of this invention, an access door is provided in an inner housing and is movable separately from the fan duct and fan cowl doors. This separately movable door provides access to components within the internal housing. In a disclosed embodiment, the components may include a gear box, and/or an electrical generator. In one disclosed embodiment, the separately movable access door does move with the fan duct doors, however, it is also movable to an open position while the fan duct doors remain in a closed position.

These and other features of the present invention can be best understood from the following specification and drawings, the following of which is a brief description.

DETAILED DESCRIPTION OF THE PREFERRED EMBODIMENT

Figure 1:
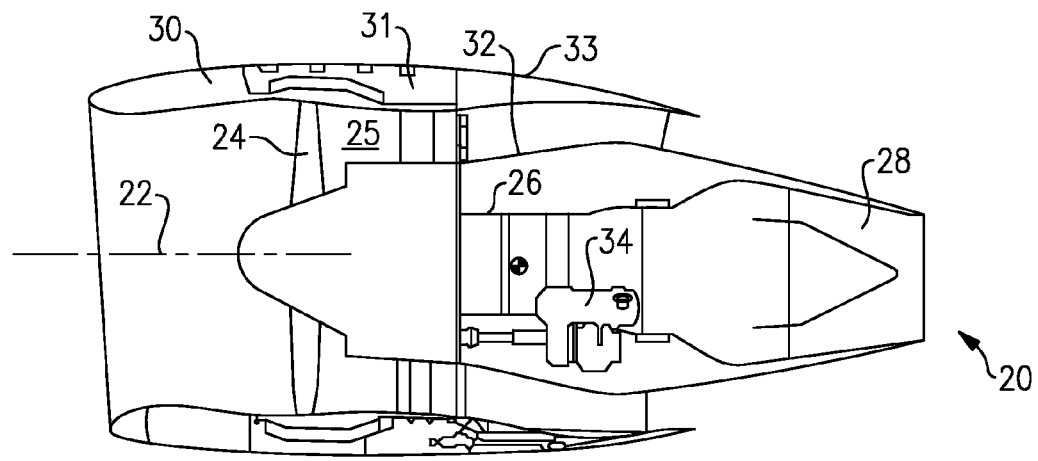
FIG. 1 is a schematic view of a gas turbine engine.

A gas turbine engine 20 is illustrated in FIG. 1. As known, a fan 24 rotates about a central axis 22. An internal core 26 includes a compressor, a combustor section, and a turbine section, as known. A portion of air from the fan 24 is delivered into core 26. An outlet nozzle 28 discharges the core engine gas flow. The majority of the fan air is delivered into a bypass duct 25. Bypass duct 25 is defined between a nacelle 30 and an outer periphery of an inner housing 32. Included in the nacelle 30 are fan cowl doors 31, and fan duct doors 33.

As shown, there are internal components 34, which may include an auxiliary gear box, an electrical generator, etc. These components are mounted within the housing 32.

Figure 2:
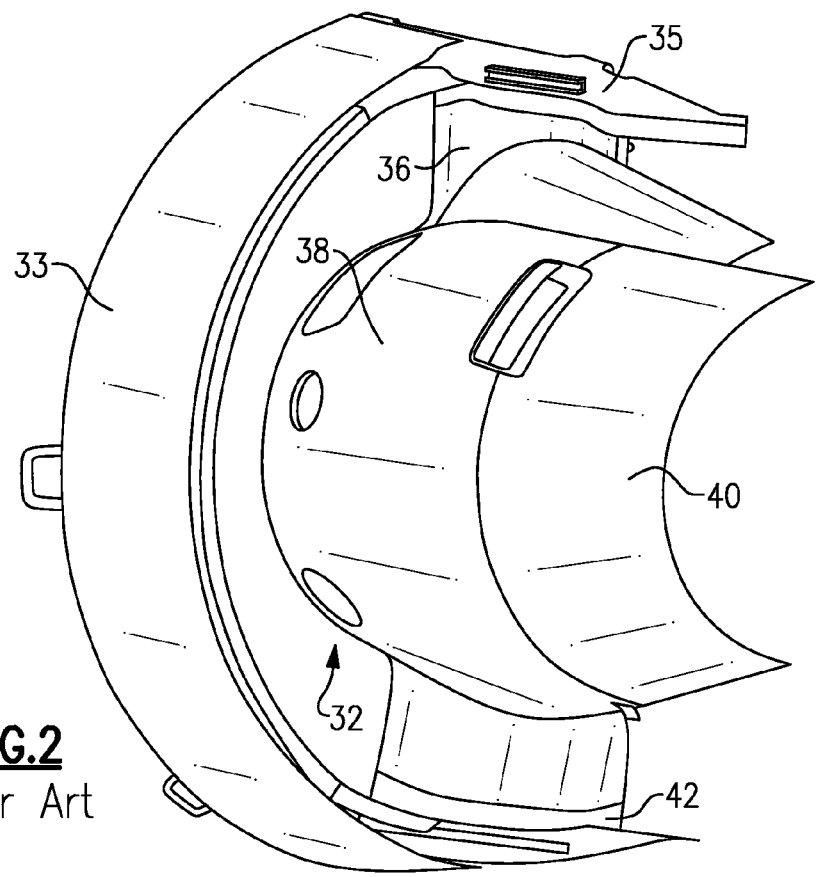
FIG. 2 shows prior art fan duct door structure.

As shown in FIG. 2, in the prior art, the fan duct doors 33 include inner housing portions 38 and 40, a hinge beam 35, a pylon 36, and a latch beam 42. Housing portions 38 and 40 are part of inner housing 32. The fan duct doors are typically provided with a pair of such structures, mounted on opposed circumferential sides of the center line 22. The doors 33 are hinged on the hinge beam 35, and latched at the latch beam 42. In the prior art, to gain access to the interior of the inner housing 32, the latch beam 42 had to be manipulated to release the latches, and the entire fan duct doors then needed to be pivoted to an open position. This is somewhat labor intensive.

Figure 3:
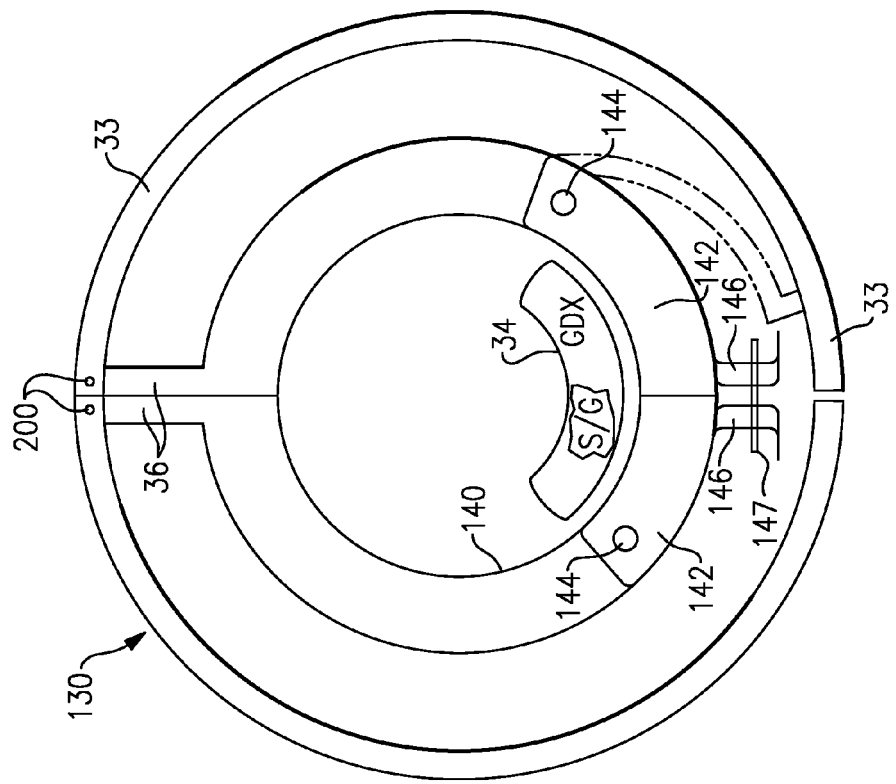
FIG. 3 is a cross-sectional view through an inventive fan duct door.

The present invention is directed to simplifying the amount of work necessary to gain access to the internal components 34. Thus, as shown in FIG. 3, in an embodiment 130, access doors 142 are pivotally attached at 144 to housing portion 140. That is, the prior art housing portion 40 may be changed to include portion 140 and access door 142. Some latching element 147 may latch two tangs 146 on the housing portions 142. As shown schematically, the entire fan duct door pivots about axis 200. Without needing to pivot the entire fan duct, the access door 142 may be pivoted to an open position (as shown in phantom) to provide access to the internal components 34. The present invention is particularly feasible in gas turbine engines having shorter nacelles, such that the location of the components 34 tends to be closer to the axial location of the end of the nacelle.

Figure 4:
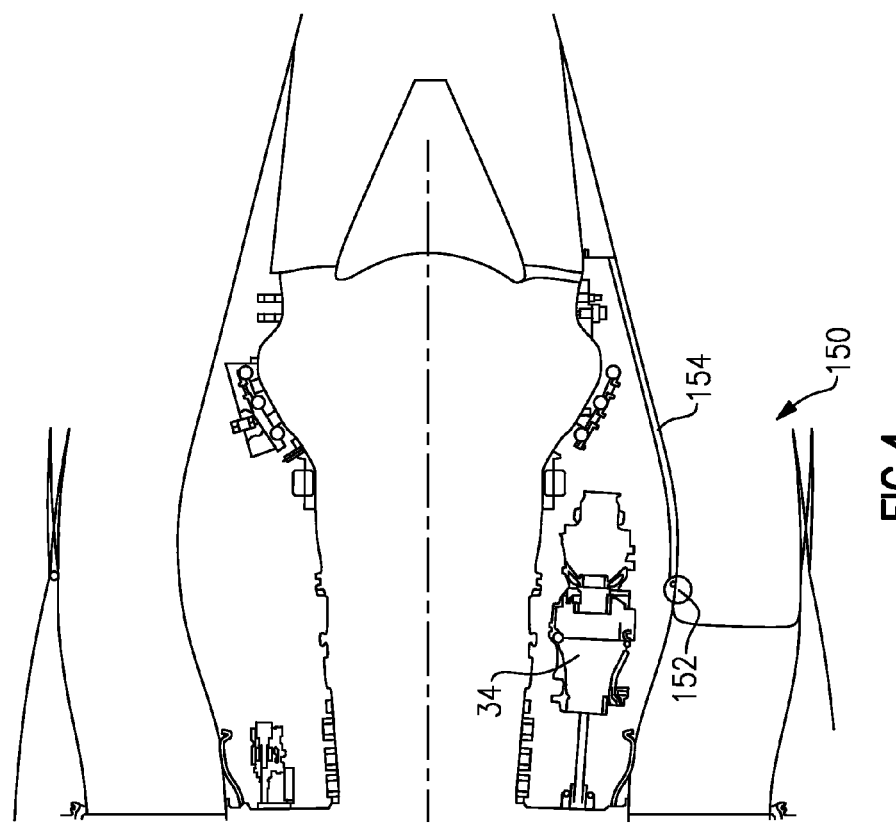
FIG. 4 shows an alternative embodiment.

FIG. 4 shows another embodiment 150, wherein the access door 154 pivots about a hinge axis 152 extending generally perpendicular to the axis of the hinges 144 of the FIG. 3 embodiment. That is, axis 152 is perpendicular to an axis that is parallel to the central axis 22.

In the prior art it is known to provide access doors for various functions such as access to lubrication system, etc. However, these access doors have not been provided to facilitate the maintenance and removal of internal components such as the auxiliary gear box or generator.

While the access doors in FIGS. 3 and 4 are shown as being pivotably attached, they could be simply removable, and secured in some appropriate manner.

When it is desired to merely access the auxiliary components such as the auxiliary gear box or electrical generator, the access door may be opened, and the fan duct doors may remain closed. At this position, there is access to the components for maintenance or removal. The fan duct doors need not be opened, and thus gaining access is simplified when compared to the prior art.

While the access door is shown as part of the fan duct doors, it may be part of the cowl doors, or even separate from both doors.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A nacelle for a gas turbine engine comprising:
a nacelle housing surrounding a central axis;
a pivotable door as part of said nacelle housing, said pivotable door defining an inner housing for surrounding internal components of a gas turbine engine, said inner housing being pivotable as part of said pivotable door; and
an access door being movably independent of said pivotable door to provide access to components within said inner housing.

2. The nacelle as set forth in claim 1, wherein said access door is also movable with said pivotable door.

3. The nacelle as set forth in claim 2, wherein said access door is pivotable relative to said pivotable door.

4. The nacelle as set forth in claim 3, wherein said pivotable door is at least two fan duct doors each independently pivotable about an axis parallel to said central axis, and each of said at least two fan duct doors carrying an access door which is pivotable relative to said fan duct door.

5. The nacelle as set forth in claim 4, wherein said access doors pivot about an axis which is parallel to said central axis.

6. The nacelle as set forth in claim 1, wherein said access door pivots about an axis which is perpendicular to an axis that is parallel to said central axis.

7. A gas turbine engine comprising:
a fan, and a central core downstream of said fan, an inner housing surrounding said central core;
a nacelle surrounding said inner housing, at least a portion of said inner housing and said nacelle being provided by a pivotable door to provide access to an interior of said inner housing;
auxiliary components positioned within said inner housing; and
an access door for providing access to said auxiliary components without requiring said pivotable door to be opened.

8. The gas turbine engine as set forth in claim 7, wherein said access door is also movable with said pivotable door.

9. The gas turbine engine as set forth in claim 8, wherein said access door is pivotable relative to said pivotable door.

10. The gas turbine engine as set forth in claim 9, wherein said pivotable door includes at least two fan duct doors each independently pivotable about an axis parallel to said central axis, and each of said at least two fan duct doors carrying an access door which is pivotable relative to said fan duct door.

11. The gas turbine engine as set forth in claim 10, wherein said access doors pivot about an axis which is parallel to said central axis.

12. The gas turbine engine as set forth in claim 7, wherein said access door pivots about an axis which is perpendicular to an axis parallel to said central axis.

13. The gas turbine engine as set forth in claim 7, wherein said access door provides an opening sufficiently large to remove at least one of the auxiliary components.

14. The gas turbine engine as set forth in claim 13, wherein said auxiliary components include at least one of an auxiliary gear box or an electrical generator.

15. A method of maintaining a gas turbine engine comprising the steps of:
providing a fan, and a central core downstream of said fan, providing an inner housing surrounding said central core, and providing a nacelle surrounding said inner housing, at least a portion of said nacelle and said inner housing being provided by a pivotable door, said pivotable door being pivotable to provide access to an interior of said inner housing, and auxiliary components positioned within said inner housing; and
providing an access door, moving said access door relative to said pivotable door to provide access to said auxiliary components for maintenance, while said pivotable door remains closed.

16. The method as set forth in claim 15, wherein said access door is pivotable with said pivotable door.

17. The method as set forth in claim 15, wherein said auxiliary component is removed through an opening provided by said access door when said access door is open.

18. The method as set forth in claim 17, wherein the auxiliary components include at least one of an auxiliary gear box or an electrical generator and said at least one of said components being removed through the opening provided when said access door is open.

* * * * *